Dec. 2, 1958   R. J. GAUBERT   2,862,426
APPARATUS FOR HANDLING SHEET MATERIAL ARTICLES
Filed Aug. 13, 1953   4 Sheets-Sheet 1
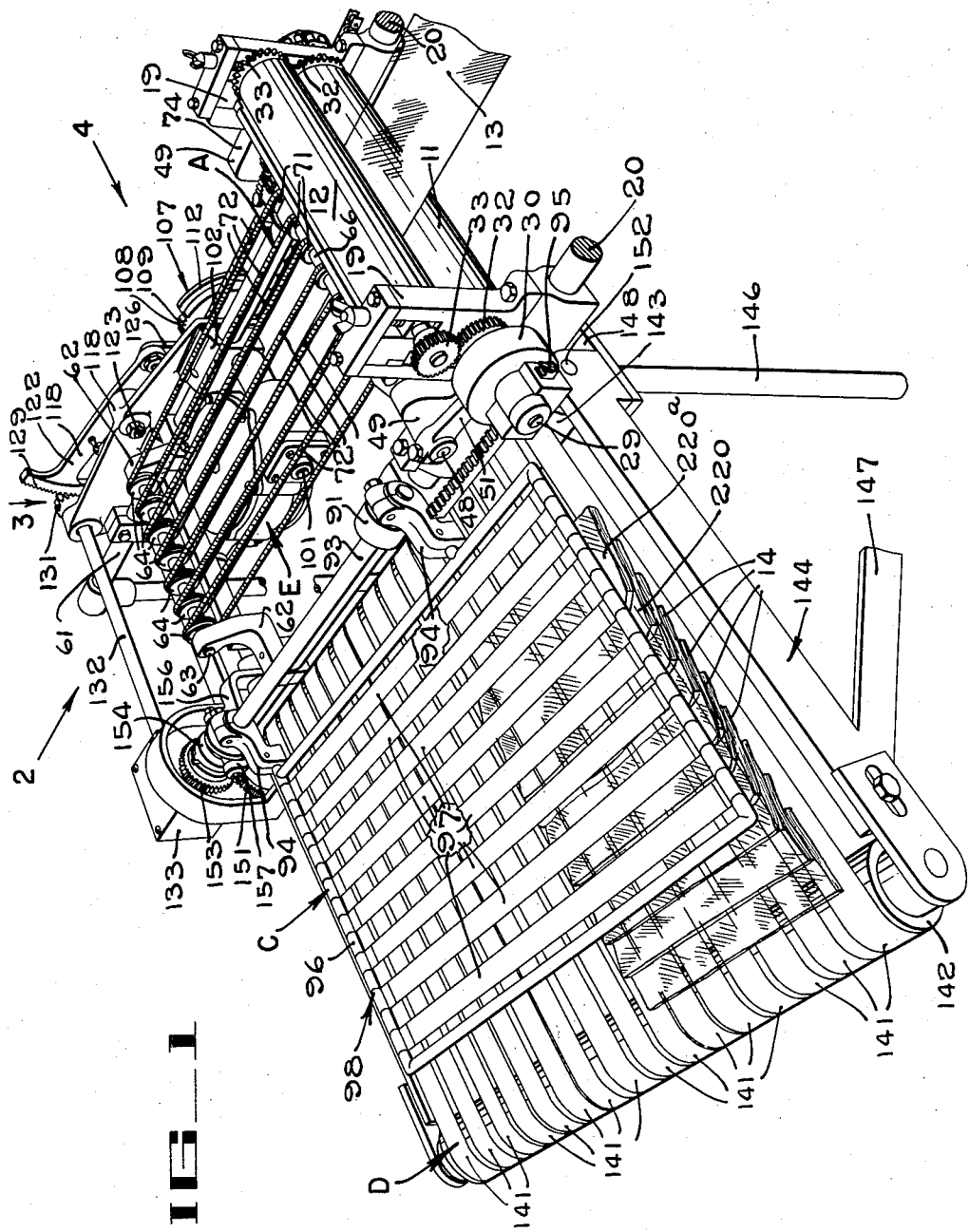
FIG—1
INVENTOR
RENE J. GAUBERT
BY Hans G. Hoffmeister
ATTORNEY

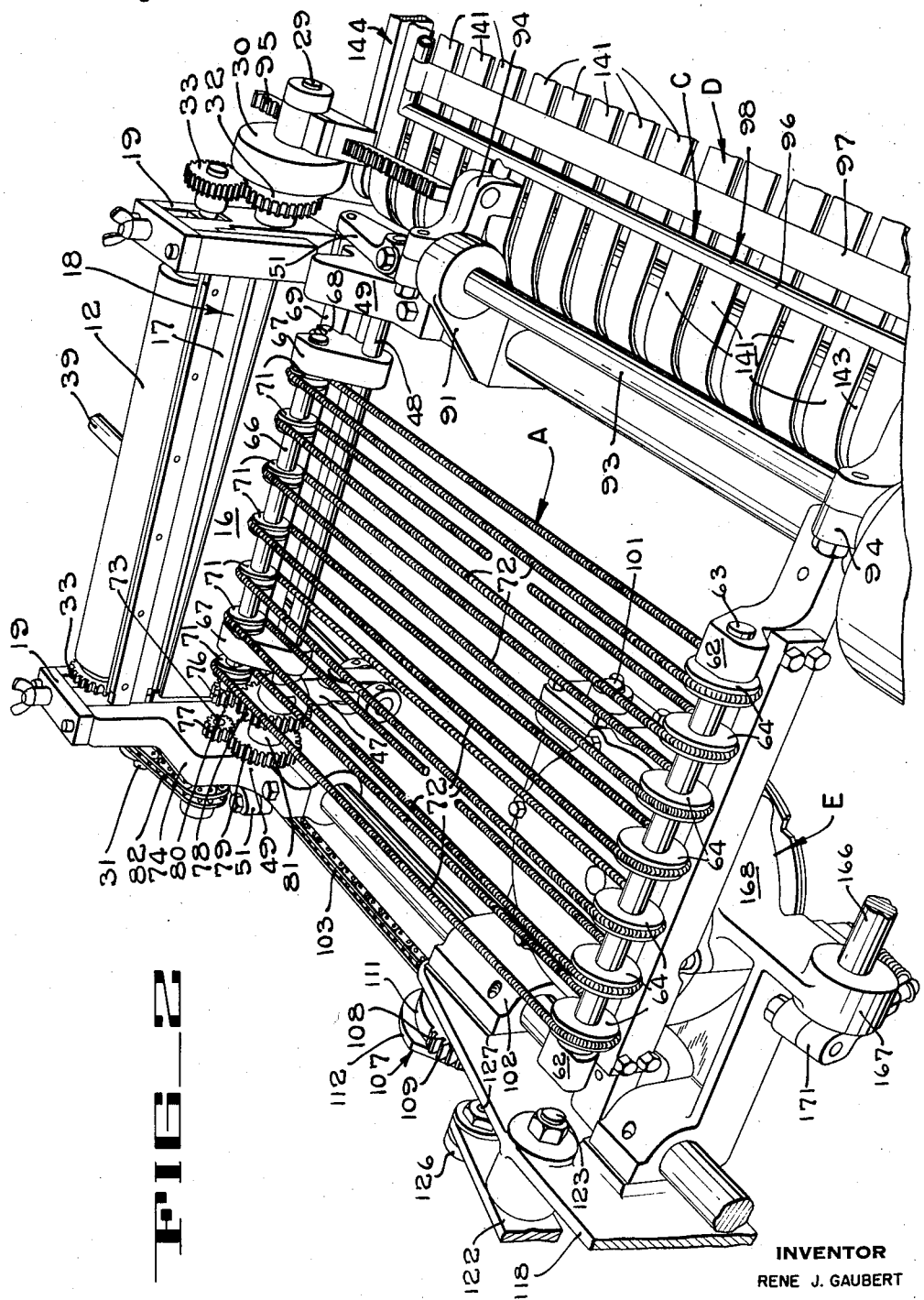

Dec. 2, 1958 R. J. GAUBERT 2,862,426
APPARATUS FOR HANDLING SHEET MATERIAL ARTICLES
Filed Aug. 13, 1953 4 Sheets-Sheet 3
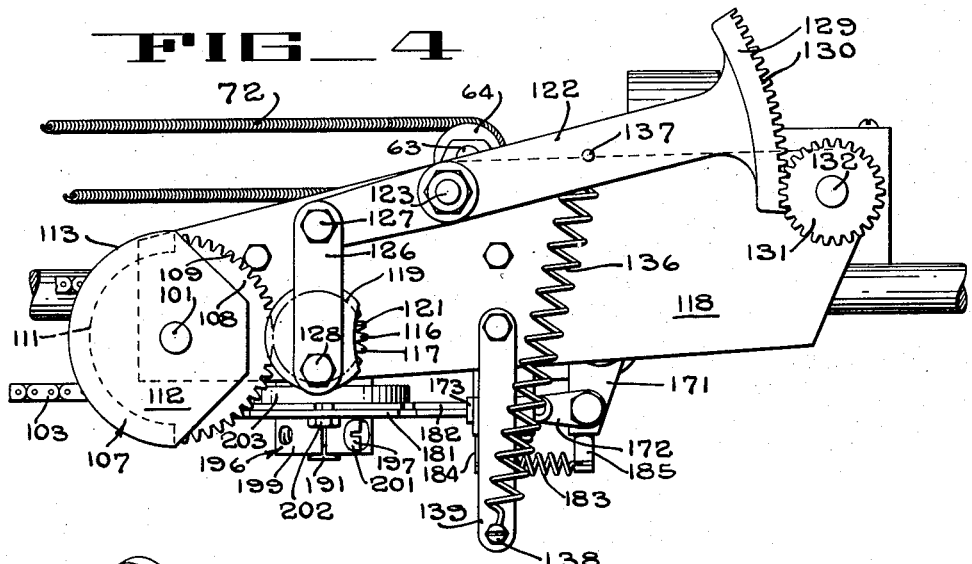
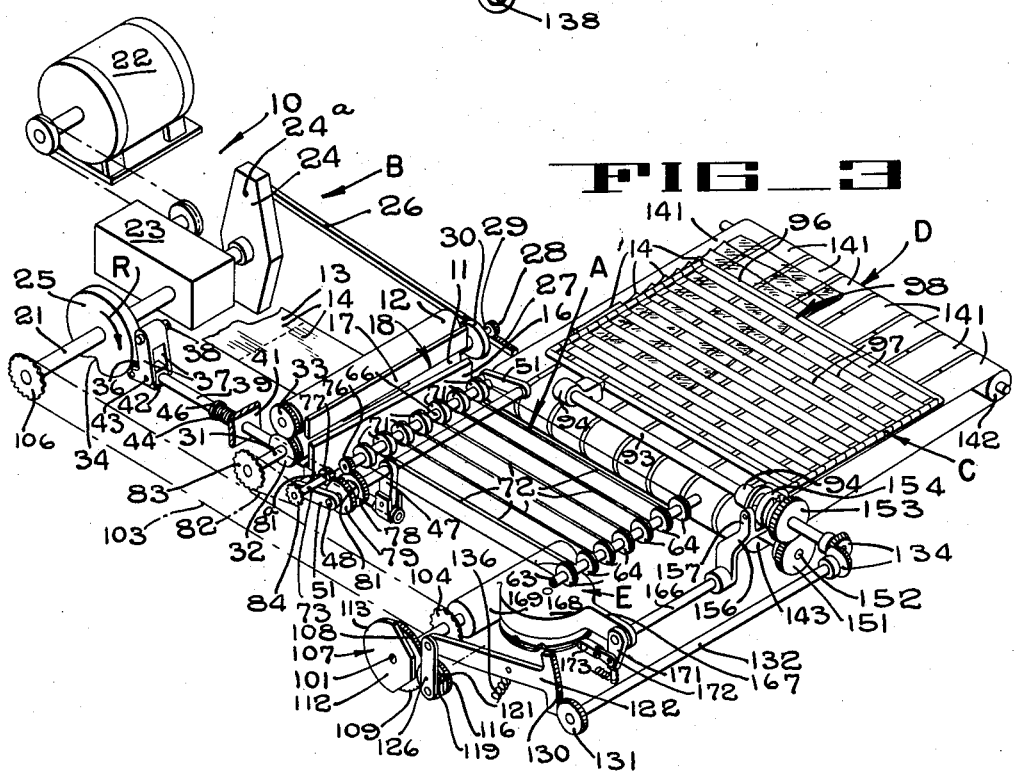
INVENTOR
RENE J. GAUBERT
BY *Hans G. Hoffmeister*
ATTORNEY Dec. 2, 1958  R. J. GAUBERT  2,862,426
APPARATUS FOR HANDLING SHEET MATERIAL ARTICLES
Filed Aug. 13, 1953  4 Sheets-Sheet 4
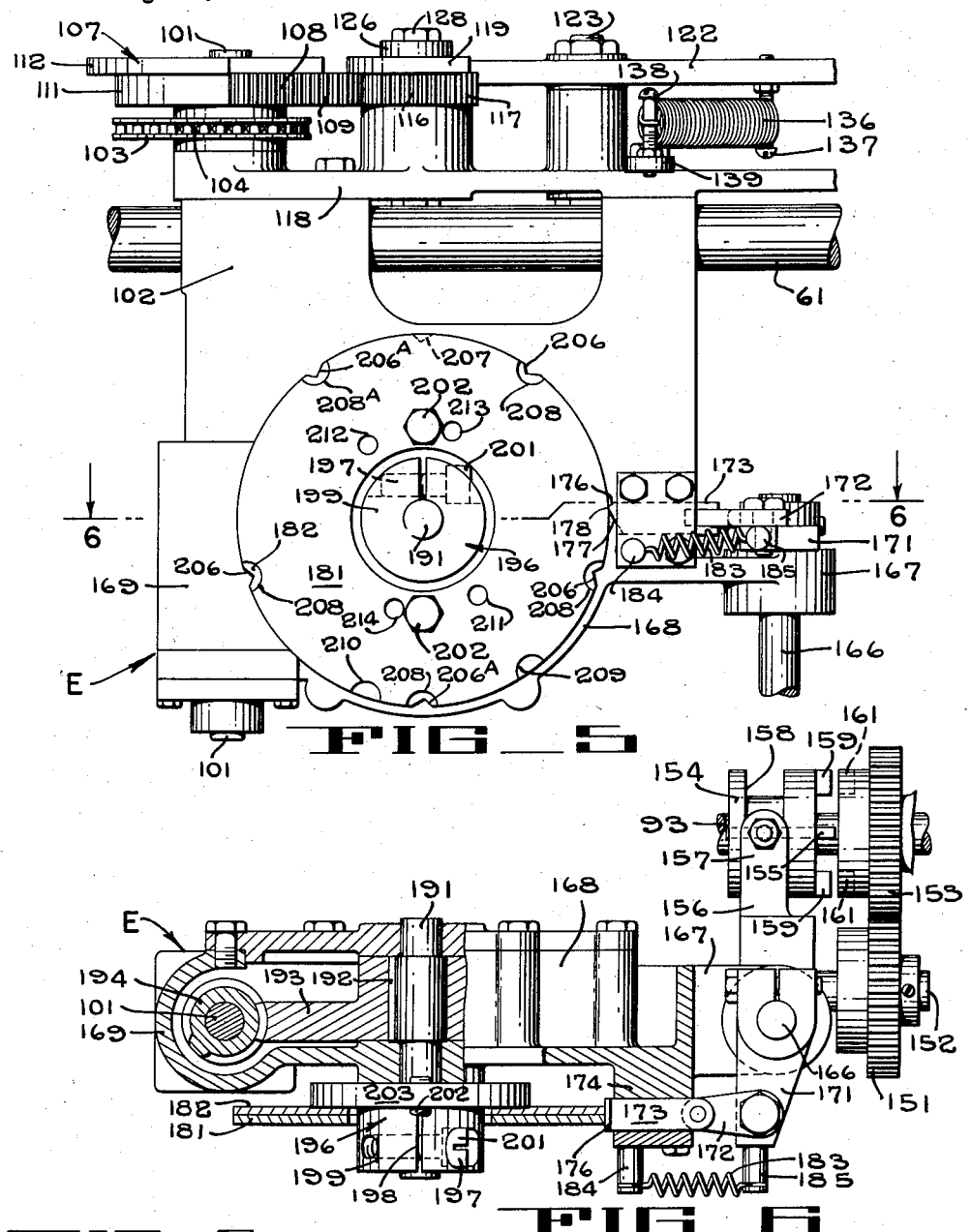
INVENTOR
RENE J. GAUBERT
BY Hans G. Hoffmeister.
ATTORNEY //  # United States Patent Office 2,862,426
Patented Dec. 2, 1958

2,862,426

APPARATUS FOR HANDLING SHEET MATERIAL ARTICLES

Rene J. Gaubert, Oakland, Calif., assignor to Food Machinery and Chemical Corporation, San Jose, Calif., a corporation of Delaware Application August 13, 1953, Serial No. 374,101

5 Claims. (Cl. 93—93)

This invention relates to apparatus for handling articles of sheet material, and more particularly to a machine for stacking sheet material articles formed into bags or envelopes.

An object of my invention is to provide an improved apparatus for arranging sheet material articles in stacks.

Another object is to provide a machine for counting sheet material items.

Another object is to provide apparatus for counting sheet material articles supplied to the apparatus in a continuous procession, such as the output of an automatic bag or envelope making machine.

Another object is to provide apparatus for piling sheet material items in uniform stacks, each containing a predetermined number of the articles.

Another object of the invention is the provision of stacking apparatus of the character indicated, which is adjustable to vary the number of articles deposited by the apparatus in each of a series of uniform stacks.

Another object is to provide a stacking machine particularly adapted to handle articles made of sheet material which is highly dielectric and consequently prone to accumulate a charge of static electricity, such as polyethylene or similar material.

Another object of the invention is to provide a stacking machine of the character indicated, in the form of a self-contained unit adapted either to be built into a fabricating machine at the time of manufacture thereof or to be readily attached to an existing machine as an accessory thereto.

Other objects and advantages of the present invention will become apparent from the following description and the drawings in which:

Fig. 1 is a perspective of a stacking machine embodying the invention.

Fig. 2 is a perspective viewed in the direction of the arrow 2 of Fig. 1.

Fig. 3 is a perspective, partially diagrammatic, viewed in the direction of the arrow 3 of Fig. 1, showing parts of a fabricating machine with which the stacker is associated.

Fig. 4 is an enlarged detail elevation viewed as indicated by the arrow 4 of Fig. 1.

Fig. 5 is a bottom plan of the counting mechanism of the stacking machine of the invention.

Fig. 6 is a vertical section taken on the line 6—6 of Fig. 5.

Fig. 7 is a perspective drawn to smaller scale, of the cam plates and cam follower of Figs. 5 and 6.

The article handling machine of the invention is designed to receive the output of a machine for making bags, envelopes or the like from such sheet material as glassine, polyethylene, "cellophane" and "Pliofilm," and to arrange the articles in uniform stacks. The embodiment of the invention illustrated in the drawings includes a receiving station A where bags fabricated by a bag machine B are deposited, and a transfer mechanism C which carries the bags singly from the receiving station A and deposits them on a storage platform D. The platform D remains stationary until operation of the transfer mechanism is repeated a predetermined number of times, thus assembling a stack containing a like number of the bags, whereupon the platform D is advanced under control of a counting mechanism E, displacing the completed stack from the area where delivery is made by the transfer mechanism C. Accordingly, as operation of the apparatus continues, uniform stacks of bags are assembled with a known number of the articles in each stack. The counting mechanism E which operates to advance the storage platform D upon completion of each stack is adjustable to vary the number of articles to be contained in each stack.

The bag making machine B includes a drive mechanism 10 for actuating draw rolls 11 and 12 to periodically advance a continuous flat tubular web 13 of interconnected bags 14 folded and sealed by suitable mechanisms (not shown) which comprise portions of the bag machine B. The distance through which the web 13 advances each time the draw rolls 11 and 12 are actuated corresponds to the length of one bag 14, and the leading end of the web is projected between the blades 16 and 17 of a trimmer 18, and over the receiving station A. The parts of the bag machine B are so correlated that each time the web 13 comes to rest, a portion of the web which must be severed to release a completed bag 14 is aligned with the plane of operation of the trimmer 18, whereupon the lower movable blade 16 is actuated, cutting the web 14 and freeing a completed bag to fall onto the receiving station A of the stacker.

The draw rolls 11 and 12 and the trimmer 18 are operably mounted on opposed brackets 19 (Figs. 1 and 2) carried by parallel longitudinal extensions 20 of the frame (not shown) of the bag making machine B, and are operated by power derived from a drive shaft 21 rotated at constant speed by a motor 22 through a transmission mechanism 23. The drive shaft 21 carries an adjustable crank 24 at one end and a cam 25 adjacent the other end. A rod 26 is journalled at one end on the crank pin 24a of the crank 24; and the other end of the rod 26 is provided with rack teeth 27 enmeshed with the underside of a pinion gear 28 rigid with the drive shaft 29 of a one way overriding clutch 30. The driven shaft 31 of the overriding clutch 30 carries the lower draw roll 11 and a gear 32 enmeshed with a gear 33 rigid with the upper draw roll 12, thus assuring rotation of the two rolls 11 and 12 at the same speed and in opposite directions. The overriding clutch 30 operates to impart rotation to the lower draw roll 11 in a clockwise direction as viewed in Fig. 3, and the rolls 11 and 12 are rotated to advance the web 13 during the one half revolution of the crank 24 which imposes tension on the rod 26. During the other half revolution of the crank 24 rolls 11 and 12, and web 13 are motionless due to the fact that the clutch 30 transmits rotary motion in one direction only. The direction of rotation of the shaft 21 which carries the crank 24, indicated by the arrow R of Fig. 3, is clockwise as there viewed; and the cam 25 is so disposed on the shaft 21 that a depression 34 of the cam 25 registers with a cam follower roller 36 when the crank 24 has rotated only a few degrees beyond its dead center position which marks the beginning of the idling stroke, i. e., the return stroke, of the rod 26.

The cam follower 36 is rotatably mounted between the lower ends of a pair of arms 37 pivotally supported from the frame (not shown) of the bag making machine by a pin 38. A rod 39 extending through and fitting loosely within a hole in a frame extension 41, is attached at one end to a block 42 disposed between the arms 37 and pivotally connected thereto by a pin 43. A spring 44 under compression between the frame extension 41 and a collar 46 rigid with the rod 39, presses the follower roller 36 against the cam 25. The other end of the rod 39, is pivotally connected to a lever 47 rigid with a transverse shaft 48 rotatably supported in opposed bearings 49 (Figs. 1 and 2) carried by the frame extensions 20 adjacent the draw roll brackets 19. An arm 51 is rigidly secured to the shaft 48 adjacent each end thereof, and each arm 51 is operably connected at its outer end to the lower, movable blade 16 of the trimmer 18. The parts are so arranged that when the cam follower 36 moves into the depression 34 of the cam 25 permitting the rod 39 to move to the left, as viewed in Fig. 3, the lever 47 is actuated by the rod 39 to impart rotary motion to the shaft 48, raising the arms 51 and thereby actuating the movable blade 16 of the trimmer 18 to sever a completed bag projected beyond the cutting knife by the draw rolls 11 and 12.

The bag stacking mechanism of the invention is attached to the bag making machine B by means of two spaced parallel rods 61 which provide support for the mechanism of the receiving station A and the transfer mechanism C. The rods 61 are attached, as by threading (not shown), to the bases of the two bearings 49 of the trimmer actuating shaft 48 and are in axial alignment with the extensions 20 of the frame (not shown) of the bag making machine B forming, in fact, continuations of said extensions. Opposed brackets 62 are mounted adjacent the outer ends of the frame extensions 61 to provide support for a transverse shaft 63 carrying a plurality of spaced pulley wheels 64. A corresponding, opposed shaft 66 is rotatably mounted in opposed brackets 67 (Fig. 2) which are mounted upon the trimmer actuating shaft 48 and which are restrained from rotating about the axis of the shaft 48 by feet 68 engaging a transverse plate 69 rigid with the brackets 19 which support the draw rolls 11 and 12. The shaft 66 is also provided with spaced pulley wheels 71 corresponding in number and position on the shaft 66 to the pulleys 64 on the shaft 63. A spring wire belt 72 is trained around each opposed pair of pulleys 64 and 71 on the shafts 63 and 66, respectively, and the upper runs of all of the belts 72 are disposed in spaced parallel relation in a common horizontal plane, thus defining the receiving station A. A stub shaft 73 is rotatably mounted in an extension 74 (Figs. 2 and 3) of one of the bearings 49 journalling the trimmer operating shaft 48. The stub shaft 73 is in axial alignment with, but is spaced from the end of, the shaft 66. A pair of gears 76 and 77 carried by the shaft 66 and stub shaft 73, respectively, are enmeshed by gears 78 and 79, respectively, rigidly interconnected by a connecting sleeve 81 freely rotatable upon the shaft 48. The function of the gears 76, 77, 78, and 79 is to impart rotary motion to the shaft 66 from the stub shaft 73 and thereby advance the belts 72 of the receiving station A but to leave a space 80 between the shaft 66 and the stub shaft 73 for a purpose presently to be explained. The stub shaft 73, and with it the shaft 66, are rotated intermittently by a chain 82 (Fig. 3) trained around a drive pulley 83 rigid with the shaft 31 of the lower draw roll 11. The chain 82 is also trained around a pulley 84 rigid with the stub shaft 73 and the diameter of which is half that of the pulley 83. Consequently, when the draw rolls 11 and 12 are operated to advance the web 13 and project a bag 14 at the end of the web between the blades 16 and 17 of the trimmer 18, the belts 72 of the receiving station A are advanced simultaneously, the upper runs of the belts moving away from the trimmer 18 and at a speed substantially twice the peripheral speed of the draw rolls 11 and 12.

Support for the transfer mechanism C is provided by spaced aligned brackets 91 (only one of which is shown) mounted upon the frame extension 61 at the side of the receiving station A, opposite the stub shaft 73. These brackets 91 rotatably support a shaft 93 upon which aligned arms 94 are rigidly mounted. The arms 94 carry a rectangular frame 96 of light tubular construction, which is provided with a plurality of spaced parallel strips 97 of any suitable strong and light material, such as fabric tape. The tapes 97 and frame 96 cooperate to define a grid structure 98 of such proportions that the shaft 93 may be rotated through 180° from the position wherein it is illustrated in Figs. 1, 2, and 3, to assume a position so correlated with respect to the receiving station A that the belts 72 are disposed in the spaces between the strips 97 with the upper runs of the belts slightly above the level of the strips. The space 80 between the shaft 66 and the stub shaft 73 accommodates part of the tubular frame 96 of the grid structure 98, thus permitting the grid 98 to assume this correlated position with respect to the receiving station A. This is the position occupied by the grid 98 whenever a bag 14 is being advanced by the draw rolls 11 and 12.

Means are provided for oscillating the grid 98 through approximately 180° about the axis of its support shaft 93 and in suitably timed relation to the operating cycle of the raw rolls 11 and 12 and the trimmer 18. As best understood by referring to Figs. 1, 2, and 3, a shaft 101 is journalled in a bracket 102 carried by the frame extension 61 on the same side of the apparatus as the stub shaft 73. The shaft 101 is driven at constant speed by a chain 103 trained around a sprocket 104 on the shaft 101 and also around a sprocket 106 secured to the end of the drive shaft 21 of the bag making machine B, and since the two sprockets 104 and 106 are of the same diameter the shaft 101 is rotated at the same rate as the drive shaft 21. Upon the outer end of the shaft 101 is secured a modified Geneva drive 107 (Figs. 3 and 4) which includes a gear 108 having teeth 109 extending throughout only half of its periphery, the remainder 111 of the periphery of the gear 108 being reduced in diameter as compared with the root circle of the teeth 109. A plate 112 is rigid with the gear 108 and is provided with a smooth peripheral edge 113 which is semi-circular about the axis of the gear 108 and which extends throughout the portion of the gear 108 having the peripheral portion 111 of reduced diameter. A small gear 116 having teeth 117 is carried by a shaft (not shown) journalled in a plate 118 rigid with the bracket 102 (Fig. 5). The teeth 117 extend throughout the periphery of the gear 116 and are enmeshed with the teeth 109 of the gear 108. The ratio of the gears 108 and 116 is two to one, and consequently, when the larger gear 108 makes one half a turn after its teeth 109 first mesh with the teeth 117, the gear 116 is rotated through a full turn. A plate 119 rigid with the gear 116 is provided with an arcuate recess 121 into which the smooth semi-circular edge 113 enters as the larger gear 108 commences the second half of a full turn. This permits the large gear 108 to continue to rotate, and at the same time, to hold the smaller gear 116 stationary until the larger gear 108 completes the second half turn, whereupon the teeth 109 of the larger gear 108 again become enmeshed with the teeth 117 of the gear 116 to begin a second cycle of operation of the mechanism actuated by the smaller gear 116.

A lever 122 is mounted for reciprocatory pivotal movement on a stub shaft 123 which is carried by the plate 118. One end of the lever 122 is pivotally connected by a bolt 127 to one end of a link 126 whose other end is rotatively engaged upon a crank pin 128 carried by the small gear 116 and plate 119. The other end of the lever 122 is provided with a sector gear 129, the teeth 130 of which are enmeshed with a pinion gear 131 carried at one end of a transverse shaft 132. The other end of the shaft 132 extends into a gear housing 133 (Fig. 1) within which it is operatively connected by bevel gears 134 (Fig. 3), to the grid shaft 93.

The lever 122 is so related to the Geneva drive 107 that throughout the period during which the small gear 116 is immobilized by engagement by the smooth edge 113 within the recess 121 of the plate 119, the lever 122 is locked in that extreme position in which the pinion gear 131 is engaged by the upper end of the sector gear 129, i. e., the opposite extreme position from that illustrated in Fig. 4. Inasmuch as the small gear 116 rotates a full 360° while the large gear 108 makes half a full turn immediately following the first engagement between its teeth 109 and the teeth 117 of the gear 116, during this half turn of the large gear 108, the lever 122 experiences a full cycle of reciprocation, i. e., rotary motion in a counterclockwise direction from the described position to the position in which it is illustrated in Figs. 3 and 4 with the teeth at the lower end of the rack 129 engaging the gear 131, and then back again to the described extreme position of clockwise rotation. The gear ratio between the sector gear 129 and gear 131 is such that the shaft 132, and with it the grid shaft 93, turns 180° in each direction during the described cycle of reciprocation of the lever 122. Inasmuch as the shaft 101 is continuously rotated, therefore, the cycle of operation of the grid 98 includes an idle period during which the grid 98 occupies the described position of correlation with respect to the receiving station A with its strips 97 positioned intermediately and below the level of the belts 72, and an active period, both of these periods being of equal duration. During the active half of its cycle, the grid 98 is raised from the described correlated position from the receiving station A, in rotary motion about the axis of the shaft 93 and downward on the opposite side of the shaft 93 to horizontal position outside the confines of the frame rods 61 and then back again to the described correlated position wherein the belts 72 extend through the interstices of the grid 98. Quick return of the grid 98 is facilitated, and back lash of the gears 129, 131, and 134 is avoided, by a spring 136 under tension between a pin 137 on the lever 122 and a pin 138 carried by an arm 139 rigid with the plate 118 (Fig. 4).

The storage platform D is arranged alongside the grid shaft 93 in a position immediately below that occupied by the grid 98 when the latter is in its outboard position (Fig. 1). This platform D comprises a plurality of parallel, horizontal belts 141 trained around spaced, parallel rollers 142 and 143 which are carried by a frame 144 extending laterally from the frame rod 61 which is proximal to the grid shaft 93. Support for the platform D in this position is provided by legs 146 and braces 147, and rigidity between the frame 144 of the platform D and the associated frame bar 61 is attained by a clamp plate 148 rigid with the inboard end of the frame 144 and extending under the bracket 19 to which it is secured by any suitable means (not shown).

A gear 151 is mounted upon the shaft 152 of the roller 143 and meshes with a gear 153 (Figs. 3 and 6) freely rotatable upon the grid shaft 93. A collar 154 is mounted upon the grid shaft 93 adjacent the gear 153 and is connected to the grid shaft 93 for rotation therewith by a feather key 155 (Fig. 6). The collar 154 is engaged, and may be moved toward and away from the gear 153, by a fork 156 carrying opposed fingers 157 extending into a peripheral groove 158 in the collar 154. Movement of the collar 154 toward the gear 153 enables clutch dogs 159 on the collar 154 to seat in recesses 161 in the adjacent face of the gear 153. The fork 156 is carried by a shaft 166 suitably journalled in portions of the frame structure, which includes an extension 167 of a gear housing 168 so disposed below the belts 72 that a cylindrical portion 169 of the housing 168 is in axial alignment with the shaft 101. The end of the shaft 166 remote from the fork 156 carries a lever 171 extending downward therefrom and having a link 172 pivotally connected to its lower end. The link 172 is also pivotally connected to the outer end of a cam follower 173, slidably mounted in a boss 174 extending downward from the bottom of the gear housing 168. The inner end of the cam follower 173 is formed with sloping surfaces 176 and 177 (Fig. 5) which converge to define a tapered cam engaging edge 178 pressed against the peripheral edges of cooperatively associated circular cam plates 181 and 182 (Figs. 6 and 7) by a spring 183 under tension between fingers 184 and 185 rigid with the boss 174 and the lower end of the lever 171, respectively.

The two cam plates 181 and 182 are mounted in face-to-face contact with each other upon the lower end of a stub shaft 191 journalled in and extending downward from the gear housing 168. The shaft 191 is also secured by a key 192 to a worm wheel 193 within the housing 168 and the worm wheel 193 meshes with a driving worm 194 disposed within the cylindrical portion 169 of the housing 168 and affixed to the shaft 101 which, as pointed out hereinabove, is rotated at constant speed by the chain 103 and sprockets 104 and 106.

The gear ratio between the worm 194 and the worm wheel 193 is 50 to 1 and consequently, the grid 98 experiences 50 complete cycles for every revolution of the shaft 191 and the cam plates 181 and 182.

A cam plate mounting head 196 is firmly attached to the lower end of the stub shaft 191 below the housing 168 by means of a clamp screw 197 extending across a radial slot 198 in the hub 199 of the head 196. The head 201 of the screw 197 is countersunk within the hub 199 to permit the plates 181 and 182 to slide freely thereover in placing them upon, and in removing them from, the mounting head 196. The plates 181 and 182 are rigidly but removably mounted upon the head 196 by means of a pair of cap screws 202 extending freely through aligned clearance holes (not shown) in the plates 181 and 182 and threaded into a flange 203 on the upper end of the head 196. The upper cam plate 182 is provided with five notches 206 spaced at equal distances around its periphery (Figs. 5 and 7). Additionally, the upper cam plate is provided with a sixth notch 207 midway between two of the notches 206. The lower cam plate 181 also is provided with five recesses 208 (Fig. 5) equally spaced about its periphery. The notches 206 and recesses 208 register with each other when the lower cam plate 181 is adjusted with respect to the upper cam plate 182 as illustrated in Fig. 5, with the result that the cam follower 173 is free to enter each of the five notches 206, successively as the plates 181 and 182 make one full revolution, and the cam follower 173 moves to the left as viewed in Figs. 5 and 6, five times during each complete rotation of the cam plates 181 and 182. Therefore, with the cam plates 181 and 182 adjusted as illustrated in Fig. 5, the grid 98 experiences ten full cycles between each two successive movements of the cam follower 173; and since the cam follower 173 is connected through the shaft 166 to the clutch actuating fork 156, the clutch 159, 161 is engaged momentarily each time the grid 98 completes ten full cycles.

In addition to the five recesses 208, the lower cam plate is provided with two additional recesses 209 and 210, the recess 209 being midway between two of the recesses 208 whereas the recess 210 is spaced at a radial angle of 18° from one of the two recesses 208 between which the recess 209 is situated. In addition to the two holes (not shown) in the lower cam plate 181 through which the cap screws 202 extend when the cam plates 181 and 182 are disposed as illustrated in Fig. 5, the lower cam plate 181 has an additional pair of holes 211 and 212 so disposed that when the lower plate 181 is turned through 36° in a clockwise direction as viewed in Fig. 5 and with respect to the upper cam plate 182, the holes 211 and 212 register with the cap screw receiving holes (not shown) in the upper cam plate permitting the cap screws 202 to extend through both plates and thereby anchor both plates 181 and 182 to the undersurface of the flange 203 but in such position of adjustment that one of the recesses 208, indicated on Fig. 5 as 208A, registers with the single notch 207 of the upper plate 182 and the recess 209 of the lower plate registers with the notch 206A diametrically opposite the notch 207. When so adjusted the lower cam plate 181 blocks all but the two diametrically opposed notches 206A and 207 with the result that cam follower 173 can move but twice during each complete rotation of cam plates 181 and 182. Therefore, under this second described adjustment of the cam plates 181 and 182, the grid 98 will reciprocate 25 times between each two successive engagements of the clutch 159, 161.

The lower cam plate 181 is provided with still another pair of holes 213 and 214 which register with the cap screw receiving holes of the upper cam plate 182 when the lower cam plate 181 is rotated counterclockwise through 18° as viewed in Fig. 5 from the position in which it is illustrated in that figure. Such rotational adjustment of the plates 181 and 182 with respect to each other brings the recess 210 of the lower cam plate 181 into register with the notch 206A of the upper cam plate 182 and effectually blocks all of the other notches 206 and 207 of the upper cam plate. Therefore, when adjusted to this third described position, the cam plates 181 and 182 effect engagement of the clutch 159, 161 only once for each complete rotation of the plates 181 and 182 and, consequently, necessitate completion of 50 cycles of operation of the grid 98 between each two successive clutch engagements.

Operation of the apparatus is as follows:

Assuming a cycle of operation of the stacking mechanism to begin with the grid 98 disposed in correlated position with respect to the receiving station A, i. e., with the strips 97 of the grid 98 arranged between and slightly below the horizontal plane of the upper runs of the belts 72, the gear 108 will be in that position in which the last of its teeth 109 have just passed out of engagement with the teeth 117 of the small gear 116. The arcuate recess 121 of the holding plate 119 will be engaged with the smooth edge 113 of the plate 112 holding the gear 116 immobilized and with it, the lever 122 and shafts 132, 93, and 152. Assuming also that the motor 22 is energized, continuously rotating the drive shaft 21, the crank 24 will be at the beginning of its power stroke, i. e., starting to pull the rod 26 and thereby starting a cycle of operation of the draw rolls 11 and 12. Consequently, at the beginning of a cycle of operation of the stacker, the web 13 of formed bags 14 is advanced by the rolls 11 and 12 to project between the blades 16 and 17 of the trimmer 18 and therebeyond onto the belts 72. Because of the described connection of the drive shaft 66 to the lower draw roll 11, the upper runs of the belts 72 are moved away from the trimmer 18 at a speed approximately twice the peripheral speed of the draw rolls 11 and 12. This motion of the upper runs of the belts 72 assures that a bag 14 being advanced into position upon the receiving station A will lie flat. The use of moving belts to receive the completed bags as they issue from the bag making machine B constitutes an important feature of the present invention inasmuch as when the bags formed by the bag fabricating machine are composed of highly dielectric material such as polyethylene, they are prone to acquire a charge of static electricity which interferes with movement of a bag along a stationary surface.

When a length of the web 13 corresponding to one bag length has passed between the blades 16 and 17 of the trimmer 18, as determined by the radial adjustment of the crank pin (not shown) whereby the rod 26 is connected to the crank 24, rotation of the draw rolls 11 and 12 ceases, thereby immobilizing the web 13 and the one bag length thereof which has passed between the blades 16 and 17. Immediately thereafter, the depression 34 of the cam 25 comes into registry with the cam follower 36, permitting the spring 44 to move the rod 39 to the left as viewed in Fig. 3 and thereby imparting rotary motion to the rockshaft 48. This actuates the trimmer 18, severing the length of web 13 which has been projected beyond the trimmer 18, and permitting the bag 14 thus completed to fall onto the upper runs of the belts 72.

The sprocket 104 is so correlated with the sprocket 106 by the chain 103 that the leading tooth 109 of the gear 108 comes into engagement with the teeth 117 of the gear 116 immediately after a bag is deposited on the belts 72 of the receiving station A. Such engagement between the gears 108 and 116 starts pivotal motion of the lever 122 counterclockwise as viewed in Fig. 4 and from that position thereof in which the sector gear 129 at the outer end of the lever 122 begins to rise, turning the shaft 132 counterclockwise as viewed in Fig. 4 and rotating the grid 98 from its position below the bag 14 lying on the belts 72. Therefore, the grid 98 lifts the bag 14 off the belts 72, and, as the grid executes 180° of rotation, carries the bag 14 to an inverted position above the storage platform D and deposits the bag 14 on as many of the belts 141 as the longitudinal dimension of the bag requires. The described 180° rotation of the grid 98 occurs while the smaller gear 116 makes a half turn, i. e., while the larger gear 108 turns through 90°, to the position illustrated in Fig. 4. As the rotation of the larger gear 108 continues, the smaller gear 116 makes another half turn, raising the link 126 and lowering the sector gear 129 and thereby reversely rotating the shafts 132 and 93 and causing return of the grid 98 to its starting position.

Upon arrival of the grid 98 in its starting position, the last tooth 109 of the gear 108 passes out of engagement with the gear 116 and the smooth edge 113 of the plate 112 moves into locking engagement with the plate 119 attached to the gear 116, thus causing the lever 122 and the grid 98 to dwell, motionless, in the described receiving position while the large gear 108 experiences the next 180° of rotation. It is during this period of rest of the grid 98 that the rod 26 again is retracted by the crank 24, again activating the draw rolls 11 and 12 to begin the next successive cycle of operation of the bag forming machine which is completed before the leading tooth 109 of the gear 108 again comes into engagement with the gear 116. Thus it may be seen that the next successive bag 14 is deposited upon the belts 72 of the receiving station A before the grid 98 is again actuated to carry the bag 14 severed from the web 13 at the end of the said second cycle of operation of the bag forming machine.

The alternate operation of the bag forming machine and of the stacking machine continues until the cam disks 181 and 182 have rotated far enough to bring one of the unobstructed notches 206 or 206A, as the case might be, of the upper cam disk 182 into registry with the cam follower 173. When this occurs the spring 183 moves the follower 173 to the left as viewed in Figs. 5 and 6, imparting sufficient rotary motion to the lever 171, shaft 166, and fork 156 to engage the clutch 159, 161. The parts are so arranged that such engagement of the clutch 159, 161 occurs just as the transfer grid 98 completes a working stroke, i. e., a stroke toward the platform D. Therefore, during the return stroke of the grid 98, its shaft 93 is connected by the gears 153 and 151 to the shaft 152 and roll 143, thereby advancing the belts 141 through a distance sufficient to segregate the bags previously delivered to the platform D from those delivered thereto during subsequent operation of the apparatus. Since the notches 206 are relatively small measured along the periphery of the disk 182, seating of the follower 173 therein prevails for a period so short that the clutch 159, 161 is disengaged prior to commencement of the next successive working stroke of the grid 98, precluding any backward motion of the belt 141 that otherwise would occur.

When the cam plate 181 is adjusted with respect to the cam plate 182 in such a manner that all five of the described advance notches 206 remain unobstructed, the described advance occurs upon transfer of ten bags from the receiving station A to the storage platform C. Inasmuch as the belts 141 remain motionless during the ten cycles of operation of the stacking mechanism, the ten bags are piled one on top of another to form a stack 220 (Fig. 1). However, upon advance of the belts 141 resulting from seating of the cam follower 173 within one of the notches 206 or 206A, the stack 220 is advanced from the position in which its component bags were deposited on the storage platform D with the result that the next series of bags transferred by the grid 98 will be assembled in a stack 220A displaced from the stack 220 (Fig. 1). This operation will be continued indefinitely so long as the bag fabricating machine remains in operation, producing a series of stacks 220 of bags 14 with ten bags in each stack.

By altering the position of the lower cam plate 181 with respect to the upper cam plate 182 in accordance with the explanation hereinabove, so that the notch 206A and one of the notches 207 of the cam plate 182 are open to entry of the cam follower 173 thereinto, the bags 14 will be assembled into stacks, consisting of 25 bags; and if the cam plate 181 is shifted to its third alternate position, so that only one notch 206A in the upper cam plate remains unobstructed, each of the stacks of bags 14 assembled on the storage platform D will consist of 50 bags.

Having thus described my invention, what I claim as new and desire to protect by Letters Patent is:

1. Apparatus for arranging articles in stacks comprising a stacking platform including a frame, spaced rollers journalled thereon, and a belt trained around said rollers, means for depositing a succession of articles on said platform in predetermined position with relation to said frame to form a stack of the articles on the belt, and means for moving the belt upon completion of a stack containing a predetermined number of the articles including a driven clutch member operably connected to one of said rollers, a driving clutch member, one of said clutch members being movable into and out of engagement with the other clutch member, means for rotating said driving clutch member, means yieldably urging said movable clutch member into engaging relation with said other clutch member, a cam follower operably connected to said urging means for movement therewith, two substantially congruent cams adjustable with respect to each other and disposed in the path of movement of the follower to restrain movement of the follower by said urging means, each of said cams having a plurality of spaced peripheral recesses therein with the recesses on one cam having a peripheral spacing different from the peripheral spacing of the recesses on the other cam, means for securing one of said cams to the other cam with selected recesses of the one cam registering with selected recesses of the other cam to predetermine the number of recesses remaining open for the entry of said follower thereinto, and means interconnecting the cams and the article depositing means for advancing said cams in predetermined timed relationship with said article disposing means.

2. Apparatus for arranging articles in stacks comprising means defining a station for receiving the articles, transfer means mounted adjacent said receiving station for reciprocatory movement between said receiving station and a position removed therefrom, a storage platform for stacks of the articles movably mounted at said removed position, a clutch interposed between the storage platform and the transfer means and engageable to effect advance of the platform by the transfer means in response to movement of the transfer means, and periodically operable means for engaging the clutch for a limited time of shorter duration than required for movement of the platform through a distance corresponding to a lateral dimension of one of the articles.

3. Apparatus for arranging articles in stacks comprising a movable stacking platform, means for depositing a succession of articles onto said platform, and means for moving the platform upon receipt thereby of predetermined number of the articles including a driven clutch member operably connected to the platform to move the same, a driving clutch member operably connected to said article depositing means to be driven thereby, one of said clutch members being movable into and out of engagement with the other clutch member, means yieldably urging said movable clutch member into engaging relation with said other clutch member, a cam follower operably connected to the urging means for movement therewith, two substantially congruent cams adjustable with respect to each other and disposed in the path of movement of said follower to disable the clutch member urging means, each of said cams having a plurality of spaced peripheral recesses therein with the recesses on one cam having a peripheral spacing different from the peripheral spacing of the recesses on the other cam, releasable means for securing one of said cams to the other cam with selected recesses of the cams registering with each other to predetermine the number of recesses adapted to be entered by said cam follower, and means operably connected to said article depositing means for advancing said cams in synchronous relation with operation of the article depositing means.

4. A stacking machine comprising a movably mounted platform, repeatedly operating means for depositing articles onto said platform, means for moving the platform, means operably connected to said article depositing means for actuating said platform moving means, a clutch interposed in said platform moving means, yieldable means urging said clutch to engaged condition, clutch disengaging means mounted in cooperative relation with the clutch, a cam follower connected to said clutch operating means for movement therewith, two substantially congruent cams adjustable with respect to each other and disposed in the path of movement of said follower to actuate the clutch disengaging means by blocking movement of the follower by said urging means, each of said cams having a plurality of spaced peripheral recesses therein with the recesses on one cam having a peripheral spacing different from the peripheral spacing of the recesses on the other cam, means for securing one of said cams to the other cam with selected recesses of one cam registering with selected recesses of the other cam to predetermine the number of recesses adapted to be entered by said cam follower, and means operably connected to said article depositing means for advancing the cams a predetermined distance in response to each operation of the article depositing means.

5. Stacking apparatus comprising a movable platform, means for depositing a succession of articles onto said platform, means for moving the platform, a clutch interposed in said platform moving means, clutch operating means mounted in cooperative relation with the clutch, a cam follower connected to said clutch operating means for movement therewith, two cams movably mounted in adjacent relationship and adjustable with respect to each other and disposed in the path of movement of said follower to restrain movement of the follower, each of said cams having a plurality of spaced peripheral recesses therein with the recesses on one cam having a peripheral spacing different from the peripheral spacing of the recesses on the other cam, means for securing one of said cams to the other cam with selected recesses of one cam registering with selected recesses of the other cam to close selected recesesses against the entry of said follower thereinto, and means operably connected to said article depositing means to be actuated thereby for moving said cams.

References Cited in the file of this patent

UNITED STATES PATENTS

| | | |
|---|---|---|
| 757,248 | Barber | Apr. 12, 1904 |
| 918,084 | Pancoast | Apr. 13, 1909 |
| 1,770,973 | Coy | July 22, 1930 |
| 2,382,998 | Kleinschmidt | Aug. 21, 1945 |

FOREIGN PATENTS

| | | |
|---|---|---|
| 621,174 | France | Jan. 31, 1927 |